United States Patent [19]

Noble

[11] Patent Number: 4,909,111

[45] Date of Patent: Mar. 20, 1990

[54] SAW TABLE

[76] Inventor: Walter E. Noble, 69 Prennan Ave., Islington, Ontario, Canada, M9B 4C2

[21] Appl. No.: 269,025

[22] Filed: Nov. 9, 1988

[51] Int. Cl.⁴ .......................... B27B 27/04; B27B 27/06
[52] U.S. Cl. ......................................... 83/397; 83/478;
 83/489; 83/467.1; 83/468.4; 83/574; 83/581;
 83/701; 269/303; 269/319
[58] Field of Search ...................... 83/397, 478, 471.2,
 83/472, 489, 467 R, 467 A, 468.1, 462.4, 564,
 574, 581, 821, 829, 823, 701; 269/289 R, 303,
 305, 315, 319

[56] References Cited

U.S. PATENT DOCUMENTS

| 2,599,893 | 6/1952 | Butler | 83/574 |
| 2,899,989 | 8/1959 | Sells | 83/574 |
| 3,901,498 | 8/1975 | Novak | 83/581 |
| 4,079,648 | 3/1978 | Chappell | 83/471.2 |
| 4,163,404 | 8/1979 | Lavis | 83/397 |
| 4,206,672 | 6/1980 | Smith | 83/477.2 |
| 4,300,426 | 11/1981 | Weaver | 83/471.2 |
| 4,317,562 | 3/1982 | Thibodaux | 83/477.2 |

Primary Examiner—Hien H. Phan
Attorney, Agent, or Firm—Kenneth M. Garrett

[57] ABSTRACT

A saw table suitable for use with a portable circular saw comprises a bed, and upstanding therefrom adjacent the rear end a pair of walls meeting at an apex including an angle of 90° pointing towards the forward end, forming a miter fence. A pair of axially aligned transversely spaced rails are supported about the bed for engagement of the soleplate of the circular saw for movement along channels provided in the rails. The table is intended for use by pulling the saw through a workpiece to be cut, and the saw is normally parked rearwardly of the miter fence. Supplementary tables to overlay the bed are provided for cross-cutting, and bevelling.

11 Claims, 2 Drawing Sheets

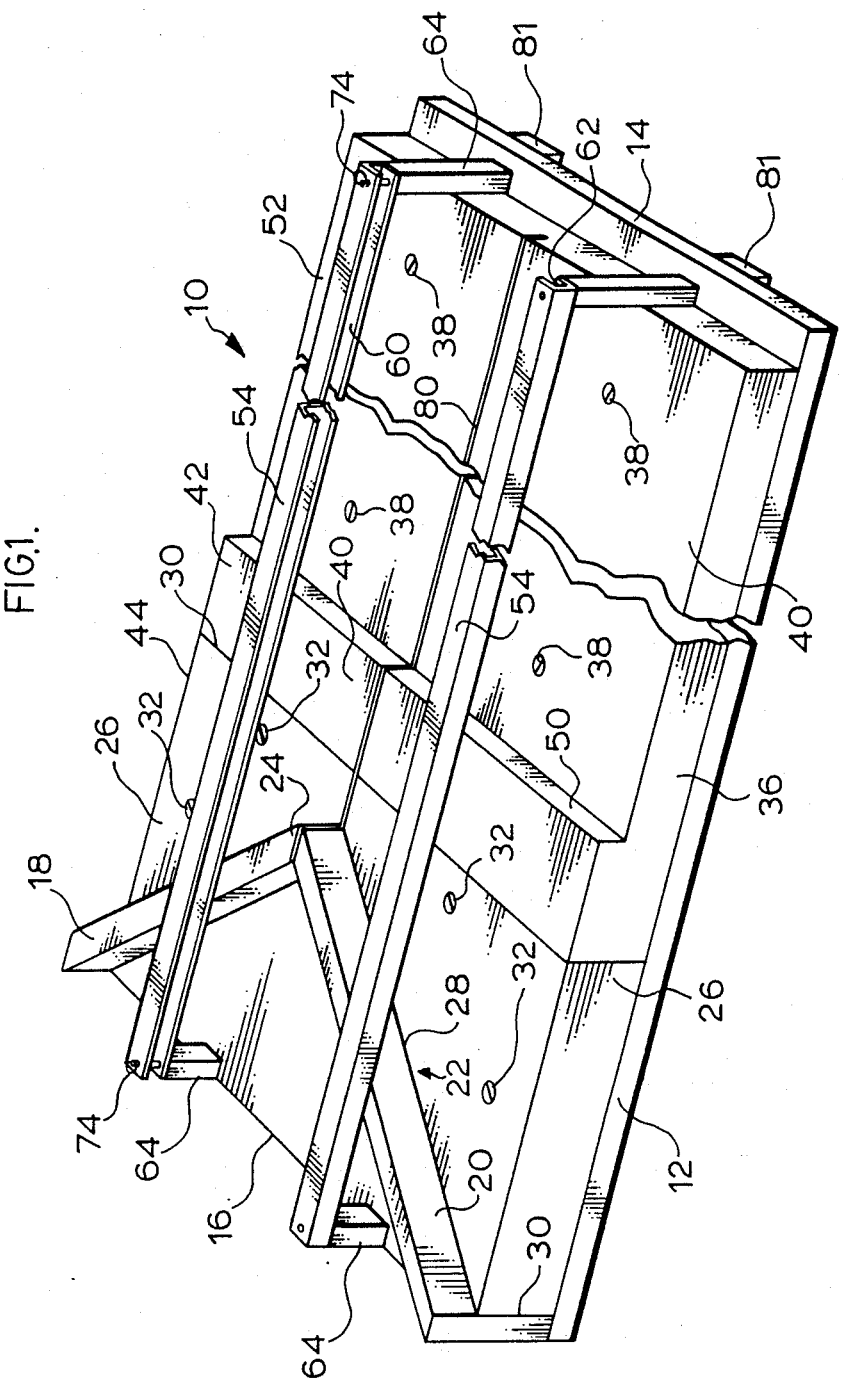

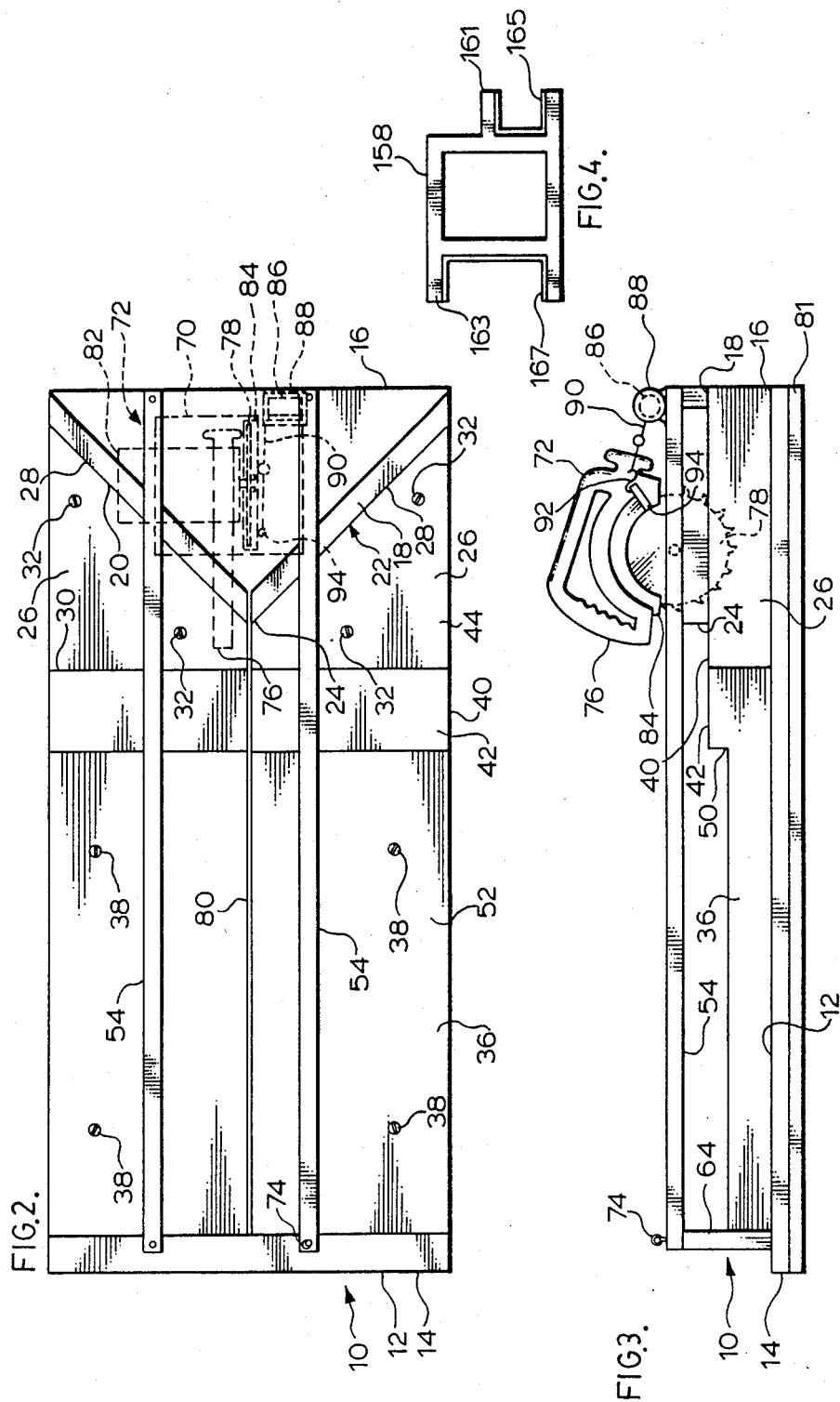

SAW TABLE

FIELD OF INVENTION

This invention relates to a simple low-cost device for controlling the operation of a portable power circular saw hand-tool to achieve accurate, reproducible miter and cross-cuts, without splintering of the edge of the workpiece.

BACKGROUND OF INVENTION

The portable hand-held circular saw is a low-cost tool that is broadly used for rough carpentry.

Unfortunately this tool, even when guided by a straight-edge clamped to the workpiece, does not make clean, unsplintered cuts. Some splintering of the cut edge of the top surface of the workpiece is inevitable, even with a fine-toothed saw blade.

The cutting action of the blade is such that the teeth at the bottom edge of the blade move away from the operator and upward to the soleplate. The teeth thus tend to lift the workpiece so that it is necessary to hold the soleplate firmly against the workpiece to avoid "chattering" or binding, which can be dangerous.

The hole in the soleplate, through which the blade projects, is wide and does not support the wood fibers against the splintering forces of the saw teeth. Cutting the workpiece with the show surface facing down is of some help but the hand-held portable circular saw is not normally associated with fine carpentry, such as the cutting of door and window trim or making picture frames.

The present invention overcomes this inherent difficulty and indeed allows a well-made portable circular saw instantaneously to be converted into a machine which can make cross-cut and 45° miter cuts which are as good as those of a radial-arm-saw. Indeed, with care, it can provide cuts of cabinet-maker quality.

Before describing this invention it is necessary to explain the key characteristics of the various forms of the circular saw that are available to the craftsman. The most broadly useful tool currently available is the table-saw. With this tool the circular blade is driven by an arbor which is located below the plane of the table. The blade projects through the table from the underside, and the height and angle of the blade projection are separately adjustable.

The table-saw permits precise miter cuts and square cuts to be made by the operator holding the workpiece against a variable-angle travelling miter-jig, which is restrained to travel in a direction parallel to the flat side of the blade. The workpiece is fed into the front edge of the blade, i.e. the edge nearest to the operator. The direction of rotation is such that the teeth rise from beneath the table at the back of the blade, move toward the operator above the table and then move downwards at the front of the blade to disappear beneath the table again.

The downward cutting action of the teeth tends to hold the workpiece firmly to the table. There is no "chattering". The blade gently resists the workpiece being pushed into it. The front teeth provide a clean cut without splintering of the top surface of the workpiece although the bottom edge may be more or less splintered depending on the size and shape of the teeth. If the workpiece is held firmly against a well-designed miter-jig, if its line of travel is exactly parallel to the plane of the blade, if the "set" of the teeth is uniformly wider than the thickness of the blade, then the rear teeth will travel in the cut made by the front teeth and will not cause top-edge splintering.

This cutting action makes the table-saw, of all circular saws, particularly well-suited for "ripping" operations, i.e. cutting a very long piece of wood in the length direction. In the ripping mode a straight-edge called a "fence" is clamped parallel to the blade at the desired distance from the blade. The workpiece is caused to slide firmly along the fence into the blade. If the fence is perfectly parallel to the blade, if the work is firmly held against the fence until the cut is completed, and if the workpiece does not warp immediately after it is cut, then only the front teeth will contact the workpiece. If for some reason the workpiece becomes misaligned during cutting so that the rear teeth contact the workpiece, then the workpiece may be lifted up by the rear teeth and hurled toward the operator. This is called "kickback" and it can be dangerous. For this reason some craftsmen prefer to use a band-saw, which is not a circular saw at all, for ripping operations.

The radial-arm-saw was developed to accommodate the fact that it is not easy to move long lengths of wood in a cross-cut mode past a table-saw blade, because of the mass and the friction of the wood against the table and other support. With a radial-arm-saw the saw travels instead of the workpiece. It travels, supported by a carriage, along a radial arm which is supported at one end by a vertical post around which the arm can pivot. The radial arm can also be raised and lowered on the vertical post.

The blade is mounted directly on the motor shaft or on a stub shaft geared directly to the motor. The blade and motor assembly can be locked into a variety of positions on the carriage thus permitting bevel and even horizontal cuts. The radial-arm-saw is a sophisticated versatile machine.

Unlike the table-saw the axis of rotation of the blade lies above the plane of the table and the blade only penetrates the table less than ¼". This changes the cutting action fundamentally.

In the cross-cut mode the saw blade is normally parked away from the operator behind a straight, low, wooden "fence" which is at right angles to the plane of the blade. The workpiece is held against the front of the fence on the table, and the saw blade is pulled on its carriage through a saw-cut in the fence and through the workpiece toward the operator. The edge of the blade nearest to the operator is the cutting edge and its direction of rotation is always downwards towards the table and then backwards towards the fence. The cutting forces therefore hold the workpiece firmly to the table and to the fence. Since the workpiece is stationary there is little chance of the rear teeth catching and lifting the workpiece.

There is no splintering of the top edge of the cut, and very little splintering of the bottom edge of the cut, because the bottom surface of the workpiece is supported by the wooden table right up to the blade edge. When cross or miter cutting, then, the radial-arm-saw can make very clean unsplintered cuts suitable for the finest cabinetry work.

If instead of pulling the saw blade from its parking-place behind the fence and through the workpiece, the saw is pushed from a position at the end of the radial arm nearest to the operator through the workpiece, then an entirely different cutting action occurs. Since the far edge of the saw blade, which is rising, now does the cutting, it tends to lift the workpiece up from the table, and since there is no support for the upper surface of the workpiece, substantial splintering occurs at the upper edge of the cut.

The only disadvantage of pulling the saw through the workpiece is that the blade tends to pull itself into the work. Unless the travel is firmly restrained, the sawblade may "climb into the workpiece" instead of cutting it cleanly and the saw may jam. This tendency is easily overcome by even an unskilled operator.

The usual arrangement of a radial-arm-saw is to have the fence mounted a sufficient distance in front of the vertical post to permit the saw to be parked behind the fence. When so mounted, a typical radial-arm-saw is capable of cross-cutting a 13" board. But in a left-hand 45° miter-setting it can cut only a 3" wide board. The width may be increased by moving the fence backwards, but this tends to be a time consuming operation. Also the blade has to be raised and lowered for each change of miter. So the radial-arm-saw copes with miter changes with much less efficiency than its sophisticated construction seems to indicate.

Recently miter-boards have become available; these are intended to guide the travel of a portable circular saw to permit accurate miter cuts. In one such typical device, the soleplate of the saw sits on parallel step-tracks about 2½" above a table. The workpiece is held against a variable-angle miter fence and the saw blade is pushed through the work. The teeth tend to lift the workpiece and to splinter the upper edge of the cut. In a piece of trim this is the show surface, so the miter-board is just not good enough for fine carpentry.

Moreover, the portable saw just sits on the step-tracks. It is not held down by them. So the portable saw cannot be pulled backwards on the step-tracks because it would lift in a dangerous manner. Also when a number of 45° and 90° cuts must be made in a mixed sequence it becomes a nuisance reindexing the miter angle and rechecking its accuracy each time.

SUMMARY OF INVENTION

The device of this invention allows a well-made portable circular saw to achieve cuts of outstanding accuracy, reproducibility, labor efficiency and freedom from edge splintering, on long lumber, while retaining portability, and being instantly available to serve as a hand-guide tool when one is required. Only one tool is required to handle both rough and fine carpentry. Because the device does not require continual changing of set-ups for most of the common cuts, it avoids the tedium that leads to mistakes. Any craftsman when first using the device will instantly appreciate this feature. The device also does not require a dedicated table to support it, it may be structured so that a Black & Decker "Workmate" can perform that function, and thus be quickly available for other carpentry tasks as well.

In accordance with a broad aspect of the invention, a saw table comprises a generally planar bed surface having forward and rearward axially opposed ends, and left and right sides as viewed from the forward end. At the rearward end there is provided a miter fence which comprises a pair of arms meeting to form a right angle at an apex pointing towards the forward end.

Above the bed surface there is mounted a pair of transversely spaced apart guide rails which extend generally between adjacent the forward end to rearwardly of the miter fence. Suitably the rails may be mounted on pillars located adjacent the ends. The rails are adapted to mount the soleplate of a circular saw for axial movement therealong while constraining all other movement. The rails and miter fence are positioned such that the path of the saw blade will bisect the apex of the miter fence.

Generally speaking, the blade will be mounted towards the right hand side of the soleplate, as viewed from the handle end of the saw, and correspondingly the right hand side mounting rail will be closer to the apex than is the left rail.

The saw table preferably includes an auxiliary table which is detachably secured to the bed; conveniently the rearward edge of the auxiliary table abuts the miter fence forwardly thereof, while the forward edge is transversely aligned.

Also preferably, the saw table includes a bevel table which is detachably secured to the bed forwardly of the auxiliary table in abutment therewith. The bevel table is downwardly stepped transversely thereacross to form a rearward portion, the upper surface of which is coplanar with that of the auxiliary table, and a forward portion; suitably the forward portion will have a somewhat greater axial extent than the rearward portion of the bevel table.

In one form of the invention, the soleplate of a circular saw is engaged in an inwardly facing slot provided in each support rail so as to be slidable therealong. Preferably the rails will have a releasable stop to prevent the accidental disengagement of the saw from the support rails.

The saw is intended to be used by its being pulled through the workpiece, in the manner of a radial-arm-saw. The area of the table rearwardly of the miter fence forms a convenient park for the saw. Workpiece to be sawn at a miter angle is held manually against the miter fence, and the saw pulled through the miter fence and through the workpiece to make the cut. In a typical saw table constructed in accordance with the invention and intended to mount a circular saw having a blade diameter of about 18 cm (7¼ inches). Where the workpiece is of normal trim thickness, nominally 2.5 cm or less, the auxiliary table and the bevel table will both be in place and the rearward portion of the bevel table will serve together with the auxiliary table, to support the workpiece. Where the workpiece is thicker than this, these other tables may be removed to provide a greater cutting depth.

Where the work is to be cross-cut, a workpiece having a nominal thickness of up to about 4.0 cm will be held manually against the step provided on the bevel table. Where thicker or unusually wide work is to be handled, the bevel table is removed and the transverse fence formed by the forward edge of the auxiliary table will be employed.

Simple bevel cuts will normally be made on the forward portion of the bevel table. It will be appreciated that as the saw is adjusted to the desired bevel angle, the lower edge of the blade will swing upwardly, thereby increasing the clearance between the surface of the table and the saw blade. Accordingly, the blade of the saw adjusted to make a bevel cut at its maximum angle may not contact the bed surface of the saw table, and the bevel table functions to raise the work toward the saw blade. It will also be appreciated that bevel cutting tends to make wide grooves in the work support surface, and over a period of time this needs to be replaced.

The bevel table, due to its uncomplicated structure is easily fabricated by a home craftsman and is readily replaceable.

It will also be appreciated that if the device is to be used to cut workpieces no thicker than the maximum depth cut of the saw in the bevel position then a detachable bevel table can be avoided by suitably selecting the height at which the rails are supported above the bed of the saw table.

Portable circular saws are always provided with a blade guard which is constructed to lift automatically on pushing the saw through the workpiece. The blade guard is also normally provided with a small handle to permit normal operation of the guard. When pulling the saw through the workpiece, as is intended with the saw table of this invention, the blade guard will not function in its automatic manner, and the table is preferably provided with means for retracting the guard for such time as the saw is associated with the table. Conveniently this may comprise a tensioned recoil cord reel supported from the table and detachably securable to the handle of the blade guard to retract same, although other retracting means are contemplated.

These foregoing objects and aspects of the invention, together with other objects, aspects and advantages thereof will be more apparent from the following description of a preferred embodiment thereof, taken in conjunction with the following drawings.

BRIEF DESCRIPTION OF THE DRAWINGS

FIG. 1 shows a saw table constructed in accordance with the invention in perspective view, from the forward end; broken to indicate indefinite length;

FIG. 2 shows the saw table of FIG. 1 in plan view from above, with a circular saw and hidden detail shown in dashed outline;

FIG. 3 shows the saw table of FIG. 1 in right side elevation with a circular saw and means for retracting the blade guard thereof, and FIG. 4 shows in cross section a modified saw support rail for use with the saw table.

DESCRIPTION OF THE PREFERRED EMBODIMENT

Referring to the drawings in detail, a saw table constructed generally in accordance with my invention is identified herein by the numeral 10. Table 10 comprises a rectangular, planar bed 12 having a front end 14 and a rear end 16. A pair of vertical walls 18,20 are upstanding from bed 12, to form a miter fence 22, each wall 18,20 subtending an angle of 45° to end 16, to meet at an apex 24, forming an angle between the two walls of 90°.

Preferably walls 18,20 will be permanently secured either directly to bed 12, or to an intermediate supporting plate which is itself secured to bed 12.

Forwardly of walls 18,20 bed 12 is overlaid by an auxiliary table 26, the rearward edge 28 of which abuts walls 18,20 along the length thereof. The forward edge 30 of auxiliary table 26 is transverse to the axial direction of saw table 10. Auxiliary table 26 is demountably secured to bed 12 by screws 32.

Forwardly of auxiliary table 26 a bevel table 36 overlays bed 12 and is demountably secured thereto by screws 38. Bevel table 36 includes a rearward portion 40 which abuts the forward edge 30 of the auxiliary table 26, the upper surface 42 of the bevel table being coplanar with the upper surface 44 of auxiliary table 26. Bevel table 36 has a downward step at 50 transversely to the axial direction, and forwardly thereof a planar surface 52.

A pair of guide rails 54 with rectangular channels 60,62 aligned with the axis of bed 12 are mounted from the bed by pillars 64 located adjacent ends 14,16 of the bed. Channels 60,62 are laterally spaced apart so as to receive the lateral edges of the soleplate 70 of a circular saw 72, shown in dashed outline in FIG. 2 for the sake of clarity, in sliding relation therealong. Suitably guide rails 54 may be constructed of metal so as to be relatively stiff, and channels 60,62 may be lined therealong with a plastic or other material to reduce friction, although other arrangements may be preferred according to circumstances, including the provision of a platform to slide along channels 60,62 to which the soleplate 70 of a saw may be detachably secured. Preferably if a platform is provided to accommodate diverse saws it will be such that it can remain attached to the saw when the saw is withdrawn from the table for use as a hand tool, without detracting from the saw's utility as a hand tool. A desirable feature of this invention is that the saw can be available for both table-guide use and hand-guide use without tedious change of set-up. Stops 74 are provided at each axial end of one guide rail 54 to prevent saw 72 from being inadvertently withdrawn, one of the stops being removable to permit the saw to be readily withdrawn for use independently of table 10.

Saw 72 will normally be mounted to table 10 such that the saw handle 76 is facing the front end 14 when the blade 78 is in axial alignment. Channels 60,62 are laterally positioned so that when saw 72 is mounted in this manner, the saw kerf 80 cut by blade 78 will bisect apex 24. Generally speaking a saw 72 will be constructed such that the plane of the blade 80 will be offset towards the lateral side of soleplate 70 remote from saw motor 82 so as to give greater balance to the saw. Accordingly, as exemplified in FIG. 2, the channels 60,62 are asymetrically located relative to apex 24.

In using table 10, saw 72 will normally be parked rearwardly of miter fence 22, and the saw will be pulled towards the front end 14 of the table to cut a workpiece. Wood to be mitered will be held against fence 22, and wood to be square cut will be held against the fence formed by step 50 on bevel table 36. In either event, the cutting action of saw blade 78 will tend to urge the workpiece against the relevant fence whereby mechanical clamping of the workpiece is generally found to be unnecessary.

In the event that thicker or wider sections of wood require to be cross-cut, bevel table 36 may be removed from bed 12, and the forward edge 30 of auxiliary table 26 will then form a fence. In the event that thicker sections of wood are required to be mitered, both the auxiliary table and the bevel table 36 will be removed from bed 12.

Generally speaking the dimensions of table 10 are not critical, and will be selected in accordance with the maximum dimensions of the wood to be cut, and the cutting depth of saws that may be used with the table. It will be appreciated that auxiliary table 26 and bevel tables 36 function to raise the wood to be cut from bed 12 towards the blade. Accordingly, it is contemplated that the auxiliary table 26 and the bevel 36 may comprise a demountable laminar structure wherein ones of the laminae may be added or omitted. Bed 12 may be suitably supported from axially aligned strips 80 which serve to rigidify the bed. Desirably rails 54 will be at least partially supported by the upper edge of miter fence 22.

Saw table 10 will normally include means associated therewith for retracting the blade guard 84 of a saw 72. Accordingly, when the saw is to be used apart from the saw table, the blade guard retracting means will remain associated with the table, and the saw guard will not be disabled. One such saw guard retracting means is illustrated in FIG. 3, and comprises a spring tensioned recoil reel 86 located at the forward end of saw table 10 in a housing 88. A tension cord 90 is wound on reel 86; cord 90 terminates in a hook 92 for securing to lever 94 which actuates blade guard 84. Suitably tension cord 90 is provided with a small rubber ball adjacent hook 92 to form a stop against housing 88.

If the device is also to be used for ripping, then preferably soleplate 70 will be square, whereby saw 72 may be engaged with saw table 10 with the blade 78 in axial alignment for cross cutting and mitering, or in transverse alignment for ripping. In the ripping mode the portable saw will be clamped to the rails at the desired distance from the transverse fence, and the workpiece fed along the fence into the normal cutting end of the portable saw.

The soleplate 70 of different commercial saws 72 may vary appreciably in thickness according to the manufacturers, particularly in edge portions thereof which may in some models be planar and in others which may be upwardly turned. Accordingly, it is desirable that channels 60,62 be able to accommodate different saw models. One simple means of accommodation is to employ rails 158 having an H shaped cross section, as shown in FIG. 4. Such double sided channels include a first narrow track 161 and a second wider track 163 on laterally opposed side of a central box beam. Track 161 is provided with a plastic liner 165, and track 163 a similar liner 167 to reduce friction. Depending on how the rails 158 are mounted from bed 12, either the narrow tracks or the wider tracks can be used to engage the soleplate of a saw. Preferably the means for mounting rails 158, will include means for adjusting their lateral position, so as to accommodate a wider variety of soleplates.

The foregoing description of the preferred embodiment of the invention is illustrative only of one form thereof. It will be apparent that many changes thereto may be made, and it is intended that all such changes be encompassed within the spirit of the claims appended hereto.

I claim:

1. In combination a tool comprising:
   a saw table having a bed with a forward end and rearward end in opposition defining an axial direction therebetween and a generally planar upper surface;
   a pair of transversely spaced, axially aligned rails;
   means locating adjacent each said axial end of said bed for securing said rails above said surface;
   each said rail having an inwardly facing grooved track therealong;
   a circular saw having a soleplate, said soleplate being engageable in said tracks to permit movement of said circular saw therealong with the axis of rotation of the blade transverse to said axial direction while constraining movement of the saw in other directions;
   releasable stop means for selectively permitting the release from or engagement of the soleplate in said tracks;
   a miter fence upstanding from said surface adjacent the rearward end thereof, said miter fence having an apex pointing towards the forward end located such as to be bisected by said saw blade as said saw is pulled from said rearward end towards said forward end;
   said saw being movable along said tracks between positions wherein said blade locates completely rearwardly and completely forwardly of said miter fence, and
   an auxiliary table having a rearward edge in abutment with said miter fence and a transversely aligned forward edge; and
   means for releasably securing said auxiliary table to said bed.

2. The tool of claim 1, wherein said saw table includes a bevel table, said bevel table having a rearward edge in abutment with the forward edge of said auxiliary table, a minor, rearwardly located portion having its upper surface generally coplanar with the upper surface of said auxiliary table, a major forward portion downwardly stepped therefrom at a transversely aligned step, and means for releasably securing said bevel table to said bed.

3. The tool of claim 1, wherein said circular saw includes a retractable saw guard, and further comprising means associated with said saw table for retracting said saw guard when said saw is associated with said saw table.

4. The tool of claim 3, wherein said means associated with said saw table is a recoil reel having a cord wound thereon and means for detachably securing said cord to said saw guard for retracting same as aforesaid.

5. The tool of claim 1, wherein said soleplate is square, thereby permitting said soleplate to be engaged in said track with the axis of rotation of the blade thereof in axial alignment.

6. The tool of claim 1, wherein said rails are provided with a track on the outward facing side thereof opposed to said inward facing track having a width differing from the width of the inward facing track.

7. A saw table comprising:
   a generally planar bed having forward and rearward opposed ends defining an axial direction therebetween, and left and right sides as viewed from said forward end;
   a miter fence upstanding from said bed adjacent said rearward end, said miter fence comprising a pair of right angled arms meeting at an apex pointing towards said forward end;
   a pair of transversely spaced, axially aligned rails extending from adjacent to said forward end to a position rearwardly of the apex of said arms;
   means locating adjacent each said end for securing said rails in spaced above relation to said bed surface,
   said rails being adapted to mount a circular saw by the soleplate thereof for end to end movement therealong while constraining movement in other directions, and
   an auxiliary table having a rearward edge abutting said miter fence and a forward edge transverse to said axial direction; and
   means for releasably securing said auxiliary table to said bed.

8. A saw table as defined in claim 7, further including a bevel table locating forwardly of said miter fence and demountably supported from said bed surface.

9. A saw table as defined in claim 7, further including a bevel table, means for releasably securing said bevel table to said bed with the rearward edge of said bevel table in abutment with the forward edge of said auxiliary table; said bevel having a minor rearward portion having an upper surface generally coplanar with the upper surface of said auxiliary table and a major forward portion downwardly stepped from said rearward portion at a step extending transverse to said axial direction.

10. A saw table as defined in claim 7 further comprising recoil reel means supported therefrom adjacent the rearward end thereof, said reel means including a cord coil thereon and means for releasably attaching said cord to a retractable guard of a circular saw.

11. A saw table as defined in claim 7, wherein said rails are asymetrically located with respect to said apex.

* * * * *